April 3, 1962  F. G. KEYT ET AL  3,027,878
FLUID MOTOR CONTROL APPARATUS
Filed June 10, 1959  3 Sheets-Sheet 1

INVENTOR
FERRIS G. KEYT
MAX D. PETERS
BY Vernon A. Johnson
ATTORNEY

April 3, 1962  F. G. KEYT ET AL  3,027,878
FLUID MOTOR CONTROL APPARATUS
Filed June 10, 1959  3 Sheets-Sheet 2

INVENTOR
FERRIS G. KEYT
MAX D. PETERS
BY *Vernon A. Johnson*
ATTORNEY

April 3, 1962   F. G. KEYT ET AL   3,027,878
FLUID MOTOR CONTROL APPARATUS
Filed June 10, 1959   3 Sheets-Sheet 3

INVENTOR
FERRIS G. KEYT
MAX D. PETERS

BY Vernon A. Johnson
ATTORNEY

United States Patent Office 3,027,878
Patented Apr. 3, 1962

3,027,878
FLUID MOTOR CONTROL APPARATUS
Ferris G. Keyt and Max D. Peters, Minneapolis, Minn., assignors to Minneapolis-Honeywell Regulator Company, Minneapolis, Minn., a corporation of Delaware
Filed June 10, 1959, Ser. No. 819,422
16 Claims. (Cl. 121—41)

This invention relates to combined automatic and manual control systems for maintaining a condition at a predetermined value, or changing said condition when desired by moving a suitable condition control element. More particularly, the invention relates to such a system wherein there are no mechanical linkages connecting said manual control member and said condition controlling element.

Combined manual and automatic control systems are widely used in industry, for example, for process control, temperature regulation, pressure regulation, flight control for aircraft, and ever increasing applications of such systems are being made. Our invention will be disclosed as being applied to an aircraft control system but it should be understood that the invention could be easily applied to a wide variety of control situations.

The need for a control system of the type that we have invented will be best understood from a short review of the general field of aircraft control systems. Early aircraft control systems were merely supplemental to the basic control vested in the pilot through use of his manual control device, known as a control stick. The automatic controls made it much easier for the pilot to fly the plane, taking over many of the functions that the pilot would ordinarily have to perform, but the pilot was always aware of the fact that upon failure of the automatic system, he could effectively control the airplane through his manual control stick and the mechanical linkages connecting the stick to the condition control element, or control surface, such as the elevators for pitch control of the craft. However, in the more recent, high-performance aircraft, the design of the craft is such that at numerous flight conditions, failure of the automatic system would cause the airplane to become uncontrollable, and perhaps destroy itself, in spite of any efforts that the pilot would make to use the control stick and manually control the craft. Thus, in spite of pilot reluctance to give up manual control and rely fully on an electrical control system, they are being compelled to do so for increasing percentages of the total flight time.

In view of this increasing reliance on automatic control systems, and the decreasing ability of the pilot to control a craft through a control stick and mechanical linkages, it has become apparent that there will be an increasing demand for a light weight, all-electrical control system wherein the mechanical linkages are eliminated. Perhaps the main advantage of this conversion would be the weight saving involved, since the weight of the electrical system could be in the order of ⅕ or less of the weight of the conventional control system. However, in view of pilot reluctance to place full reliance on automatic electrical control systems, it is essential that a very simple electrical system be used, wherein there is inherent reliability of a very high order.

With this background in mind, we have invented a simple and reliable control system wherein a normal electrically operated automatic control system, commonly known as an automatic pilot, is combined with a pilot's control stick that generates electrical signals for manual steering of the controlled craft. These manual steering signals are normally superimposed on the signals from the automatic system, to thereby operate a servomotor and control the craft by moving the control surface. However, the manual steering signals are also connected for simultaneous and direct control of the servomotor in an emergency, or standby, arrangement.

It is therefore a primary object of our invention to provide a simple and reliable control system wherein the signals from an electrical automatic control system are supplemented by electrical signals generated by manual movement of a control member to operate a condition controlling member, and wherein said condition controlling member is simultaneously controlled by said manually generated signals independently of said automatic system.

A further object is to provide such a system wherein the automatic control system is provided with redundant circuits to improve the overall reliability of the system.

A further object of our invention is to provide such a system wherein a simple electro-mechanical transducer arrangement is used to operate the controlling servomotor.

Still a further object of our invention is to provide such a system wherein said manually generated signals are capable of controlling the servomotor to thereby fly the craft in the event that the automatic system fails.

These and other objects will be seen from a consideration of the following description of our invention, taken in connection with the accompanying three sheets of drawings, wherein—

Figure 1:
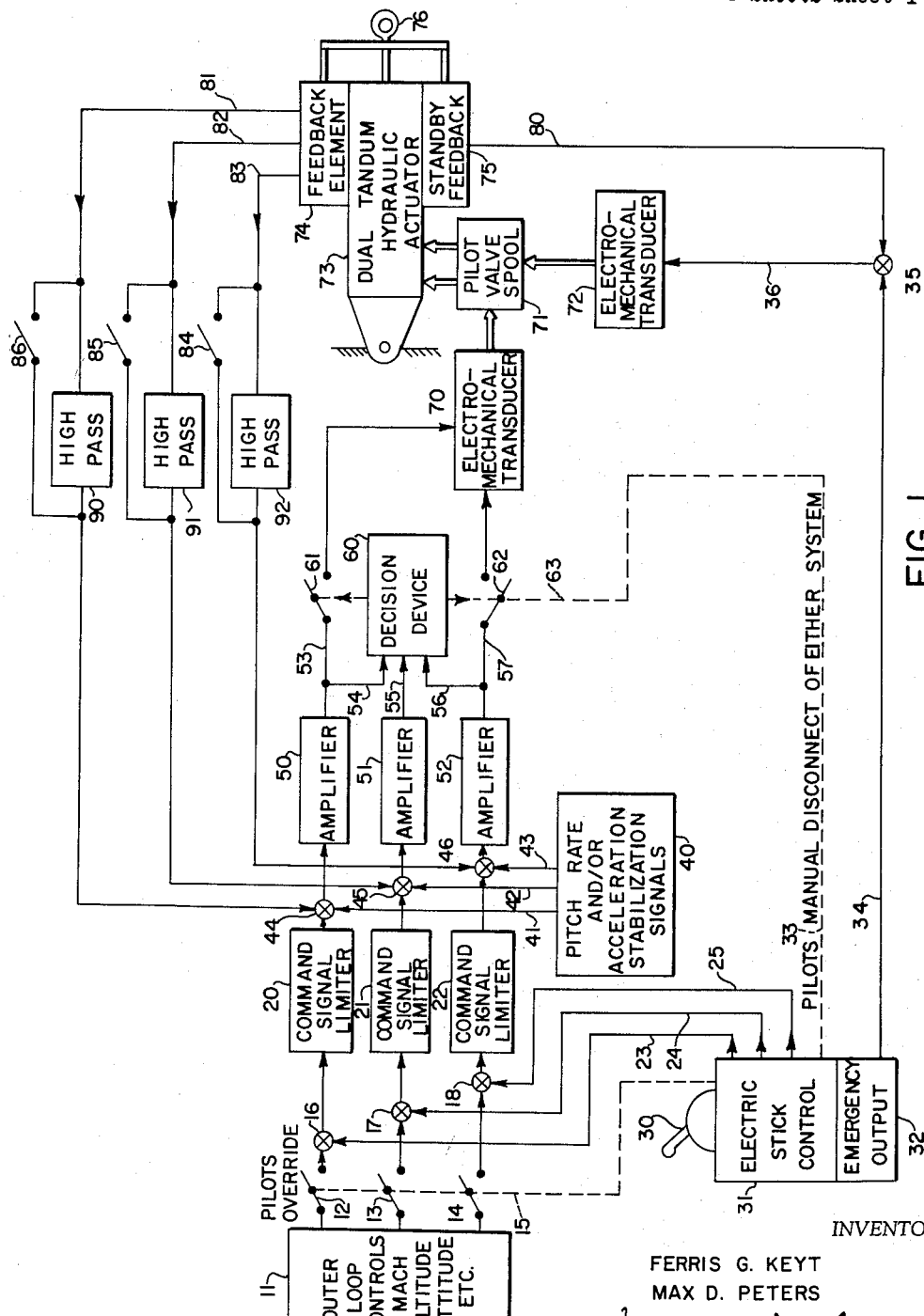
FIGURE 1 is a block diagram of our invention applied to an aircraft.
Figure 2:
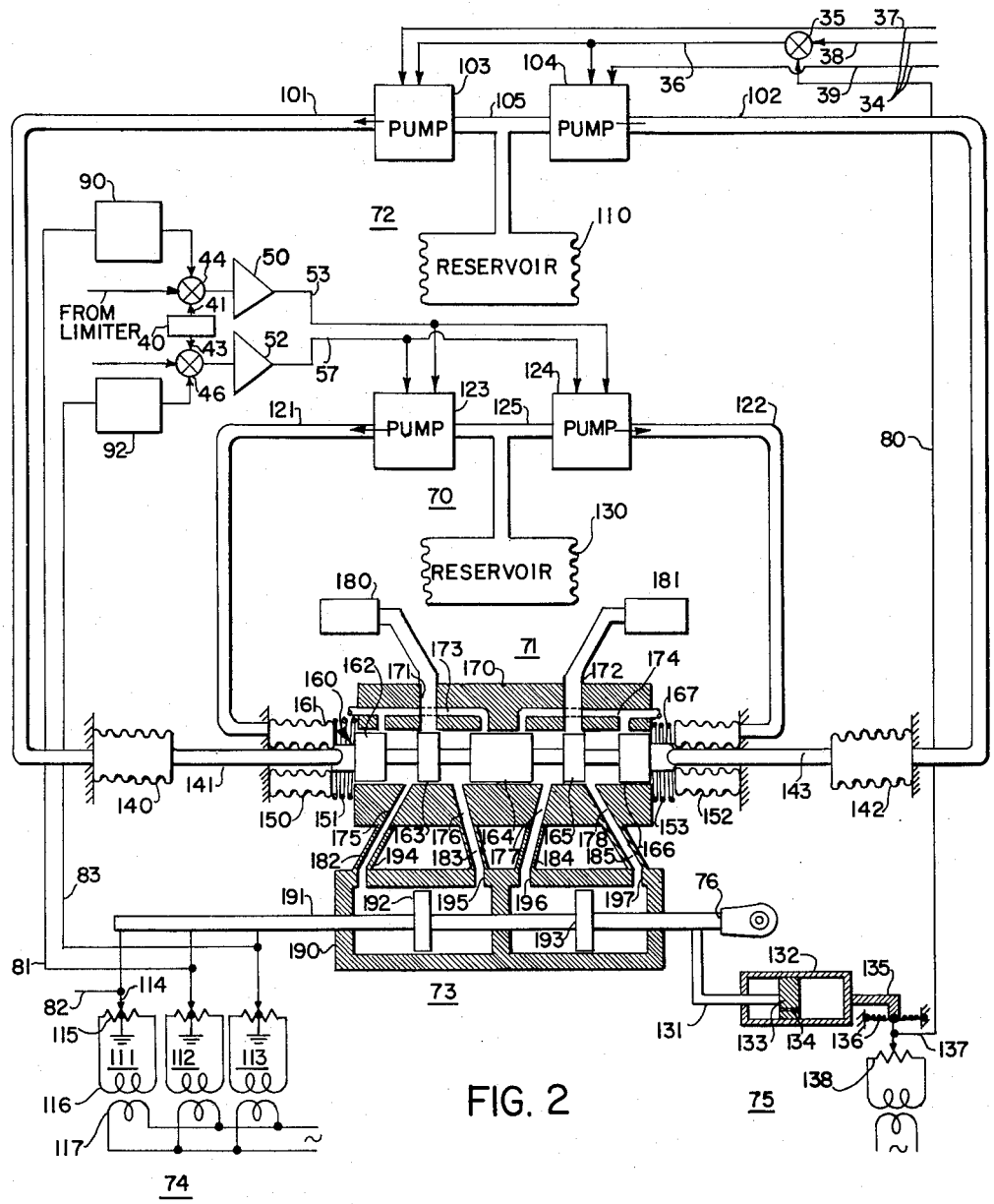
FIGURE 2 shows the servomotor that is operated by our control system, together with the electro-hydraulic transducer used in connection therewith.

Our invention will be best understood by review of the overall system operation, particularly in connection with FIGURE 1. In an automatic electrical control system, outer loop control functions such as mach, altitude, attitude, etc., are controlled by well-known devices that are designed to achieve these functions, and these are shown schematically in FIGURE 1 by the block 11. A signal from these outer loop control devices is redundantly used to control three command signal limiters, 20, 21 and 22, and three amplifiers 50, 51 and 52, as shown. The output from two of the amplifiers is used to control the electro-mechanical transducer 70. This transducer 70 controls a pair of annular bellows as shown in FIGURE 2, which bear on the control valve spool, and movement of this spool under the influence of the bellows causes the output ram 76 of servomotor 73 to be moved in accordance with the control signal of the overall system. It should be noted that this control signal may include information relating to a desired movement by the pilot, as initiated by his movement of control stick 30, due to the transmission of electrical control signals over leads 23, 24 and 25 to the command signal limiters. It should be noted that the outer loop controls are disconnected at this time by the pilot's override link 15 and contacts 12, 13 and 14, since these outer loop control devices would generate signals tending to prevent the pilot's desired movements.

Stabilization signals, or damper signals as they are conventionally known, are supplied by pitch rate sensing devices such as pitch rate gyroscopes, or acceleration sensing devices such as accelerometers, as indicated schematically in FIGURE 1 by block 40. These signals are combined with the outer loop control signals, or stick control signals, as the case may be, at summing points 44, 45 and 46, in the conventional manner. A feedback signal from feedback element 74 is also summed at these points, to null out the control signal when the desired control surface movement has been achieved.

Decision device 60 is used in connection with the redundant circuitry to improve the fail-safety of the overall system. It should be noted that decision device 60 receives signals over leads 54, 55 and 56 from the three amplifiers 50, 51 and 52, respectively. Ordinarily, these signals are identical, and contacts 61 and 62 are closed to complete circuits from amplifier 50 over lead 53 to transducer 70, and from amplifier 52 over lead 57 to transducer 70. However, when a difference is detected between the signals on leads 54 and 55, contact 61 is opened to thereby disconnect amplifier 50 from transducer 70. Similarly, if a difference is noted to exist between the signal on lead 55 and the signal on lead 56, decision device 60 is effective to open contact 62, thereby disconnecting amplifier 52 from transducer 70. This disconnecting function could be conveniently achieved by using the magnetic, comparator-type amplifier described in the copending application of Donald J. Rotier, Serial No. 772,316, filed November 6, 1958, assigned to the assignee of the present invention. It should also be noted that the pilot may be provided with a mechanical or electrical device for disconnecting both channels, which is indicated schematically by linkage 63, but this device is optional and is not necessary to proper operation of the system.

It should be noted that the signals from feedback element 74, on leads 81, 82 and 83, pass through high pass networks 90, 91 and 92, respectively, before they are received at summing points 44, 45 and 46, respectively. These high pass networks, which may be conventional R-C filter circuits, cannot be used when the craft is on the grond, since posittion feedback is needed during takeoff, and to facilitate ground checking of the craft. Thus, bypass circuits are provided for control of the craft on the ground, these bypass circuits being controlled by contacts 84, 85 and 86 and a suitable controlling relay (not shown).

It will be noted from the above description that a conventional control system is used, for the most part, except that redundant circuitry is used to provide a greater margin of safety for the pilot. However, in spite of this redundant circuitry, there may be times when the automatic system fails, and it would then still be desirable to have some control of the craft. One such failure could occur in the event that the signal in the channel including command signal limiter 21 and amplifier 51 should fail, since this channel provides the reference signal that determines whether contacts 61 and 62 will remain closed. Thus, if this channel should fail, both contacts would be opened, and there would be no control of transducer 70.

When such failure of the automatic system occurs, it is not felt necessary to provide a standby, or emergency system that will provide optimum aircraft control, and permit maximum aircraft movements. Rather, it is merely felt necessary to provide emergency control that will make it possible to fly the plane well enough to land the craft and secure the necessary repairs on the automatic system. This type of emergency control is provided by emergency output device 32, controlled by control stick 30. In this case, electrical signals transmitted from emergency output circuit 32 are directed over lead 34 to a standby electro-mechanical transducer 72. In addition, a feedback signal is received by said transducer 72 over lead 80 from "standby feedback" device 75. The two signals are summed at point 35 before being applied to transducer 72.

It should be noted that there is a minimum of likelihood of failure of this system, since components are held to a minimum, and since a very simple arrangement is used for controlling the craft. An arrangement of electro-magnetic conductive-fluid type pumps is used in the electro-mechanical transducers 70 and 72, and there are therefore no moving parts in the pumping system, as opposed to the typical nozzle-flapper hydraulic control valve which is frequently controlled by a torque motor. In our invention, the electrical signal on conductor 34 (FIG. 2) is directly effective to cause fluid flow in pumps 103, 104, 123 and 124, in a manner well known in the art. One specific embodiment of this type pump is shown in Robinson Patent 2,838,001.

*Detailed Operation*

In FIGURE 2, we have shown our control system in greater detail, and more particularly, have shown specific details of the electro-mechanical transducers 70 and 72, the pilot valve 71, and the hydraulic actuator 73. It should be noted that output ram 76 would normally be connected to the condition control member such as the elevator of an aircraft.

The pilot valve 71 and hydraulic actuator 73 are conventional, except that a dual tandem configuration is used. Valve 71 is shown schematically to include a body 170, and a spool 160 slideably mounted therein, with ports 171 through 178 provided in said valve body 170. Spool 160 consists of a shaft 161, and lands 162 through 166, and it should be noted that with the spool in the center or neutral position as shown, the lands are positioned to prevent flow of fluid between any of the ports in valve body 170.

Hydraulic actuator 73 consists of body 190, piston rod 191 having pistons 192 and 193 formed thereon as shown, and fluid ports 194 through 197. Fluid lines 182 through 185 are also provided, these lines being connected between the ports of hydraulic actuator 73 and four of the ports in pilot valve body 170, as shown.

When spool 160 is moved to the right, high pressure fluid from reservoir 180 flows between lands 162 and 163 and from there through port 175, fluid line 182, and port 194, to the left side of piston 192, thereby driving piston rod 191 and actuator ram 76 to the right. Fluid on the right of piston 192 is thereby driven out port 195, and through fluid line 183 and port 176, between lands 163 and 164 of spool 160, and out fluid line 173 to the sump (not shown) that supplies return fluid to reservoir 180. At the same time, fluid from reservoir 181 flows through port 172, between lands 164 and 165, through port 177, fluid line 184, port 196, to the left of piston 193; and fluid to the right of piston 193 is thereby forced through port 197, line 185, port 178, between lands 165 and 166, to port 174 and the sump (not shown) that supplies return fluid to reservoir 181. Thus, hydraulic ram 76 is moved to the right to effect a control movement of the control element to which it is normally connected. A similar analysis will show that movement of spool 160 to the left of its normal position would cause reverse fluid flow through the various ports and lines mentioned, so as to drive piston rod 191 and actuator ram 76 to the left.

The control force for moving spool 160 is supplied by two pairs of bellows, 140, 142 and 150, 152. Bellows 140 and 142 are arranged concentric with spool 160 and are mounted at the opposite ends of spool 160, and provided with integral control rods 141 and 143, respectively. These control rods bear against the opposite ends of the spool, and it is obvious that expansion of either one of these bellows 140 and 142 will cause movement of both control rods and compression of the opposite bellows. For example, if bellows 140 is expanded, rod 141 is moved to the right thereby pushing spool 160 to the right, which in turn pushes control rod 143 to the right and thereby compresses bellows 142.

A similar operation is provided by annular bellows 150 and 152, the center hole being large enough to permit the control rods 141 and 143 to slide therein. Bellows 150 and 152 are concentric with spool 160 and bear directly on the opposite ends of spool 160, as shown, and operate much in the manner of the above described bellows 140 and 142. The two pairs of bellows are thus axially located with respect to spool 160. When bellows 150 is expanded, spool 160 moves to the right, thereby compressing spool 152. It should be noted that springs 151 and 153 are provided to center spool 160 in the absence of any controlling fluid-flow into one of the bellows 150 and 152. These springs cause the two bellows to become equally compressed, thereby moving spool 160 to the normal, or neutral position, as shown in the drawing.

Upon re-examination of this system, it is apparent that expansion of any one of the four bellows causes compression or expansion of the other bellows in the system. For example, if bellows 140 is expanded, spool 160 moves to the right so as to compress bellows 152, and also drives control rod 143, to the right so as to compress bellows 142. Furthermore, such compression of bellows 152 with pumps 123, 124 unenergized causes fluid to be forced through the corresponding closed system including lines 122 and 121, so as to expand bellows 150. Thus, it is apparent that movement of any of the bellows causes corresponding movements of the others.

The transducers 70 and 72 are used to convert the electrical signals received from the electric stick control and the automatic control system, to a controlling force for moving spool 160. This controlling force is supplied by electro-magnetic conductive-fluid type pumps 103, 104, 123 and 124. These pumps, which are preferably used because of their simplicity, and the fact that there are no moving parts necessary to cause direct conversion of electrical energy to fluid flow, and effective to pump fluid into the bellows associated therewith so as to move spool 160.

Although we have only shown these pumps schematically, the operation thereof will be readily understood by those skilled in the art, particularly with reference to the above identified Robinson patent. Pump 103 is oriented to pump fluid into line 101, and pump 104 pumps fluid into line 102. These pumps are preferably operated differentially, as is well known in the pump art, and when they are equally energized there is no net fluid flow. However, as the energization of one increases, while energization of the other correspondingly decreases, there is a net flow in the system.

It will be noted in FIGURE 1 that a single lead 34 is schematically shown to provide the signal from emergency output device 32. However, in actual practice, item 34 is more preferably a cable containing a plurality of leads 37, 38 and 39, as shown in FIGURE 2. This plurality of leads provides the desired differential control of pumps 103 and 104. For example, with lead 38 at signal ground potential, and with a constant difference of potential between leads 37 and 39, differential control is provided by varying the relative potential difference between leads 37—38 and 38—39 at the emergency output device 32, as is well known in the art. The feedback signal on lead 80 is then summed with the signal on lead 38, and is effective to equalize the potentials between leads 36—37 and 36—39. It should be noted that equally effective operation would be achieved by providing two feedback circuits, and individually summing the signals therefrom with the signals on leads 37 and 39, respectively. This arrangement would be especially important in the event that actual summing takes place within the pumps 103 and 104, rather than externally as shown on the drawing. In that event, the two feedback circuits could be individually connected to field coils of the pumps.

The effect on the system may be best understood by using a specific example. We will assume that pump 103 is receiving a larger energizing signal than pump 104. This forces fluid into line 101 so as to expand bellows 140 and thereby drive spool 160 to the right. Bellows 142 is thereby compressed, and fluid is forced from line 102 through pump 104, and into pump-connecting line 105. It should be noted that this is a closed fluid system, and reservoir 110 is provided to compensate for fluid expansion due to temperature change.

A similar arrangement is shown for operating the two pumps 123 and 124, except that the simplicity of FIGURE 1 has been retained by showing only one lead from amplifiers 50 and 52 rather than the actual three-lead group represented thereby. It should be understood however, that pumps 123 and 124 are differentially operated by signals from amplifier 50, and are also differentially operated by signals from amplifier 52, all in the manner described above with regard to pumps 103 and 104. During operation, and assuming that pump 123 receives the larger signal, fluid flows into line 121, bellows 150 is expanded, spool 160 moves to the right, bellows 152 is compressed, and fluid flows from line 122 into pump 124 and connecting line 125. Reservoir 130 compensates for fluid expansion.

Figure 4:
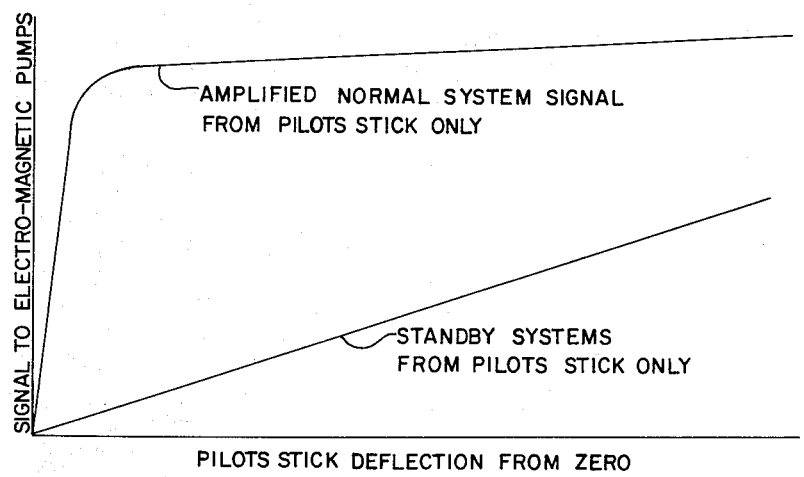
FIGURE 4 is a graph showing the relative effectiveness of the normal and standby control systems.

An important feature to note here, is the fact that transducer 72 supplies fluid to its bellows at a lower power level than is attainable from transducer 70. This will be more clearly understood by reference to FIGURE 4, which indicates that the automatic system, by reason of the amplifiers 50 and 52, causes a larger signal to be transmitted to pumps 123 and 124 than is transmitted to pumps 103 and 104 for a corresponding stick movemet. Thus, although both transducers respond to a stick movement, transducer 72 causes only nominal control of the spool 160, primary control being vested in transducer 70 and the corresponding bellows. However, in the event that the automatic system fails, and more particularly, if that failure should occur during a stick movement, the standby system would be continuously effective to control ram 76, although at a lower power level. This would permit the pilot to control the craft, and return to his field for repairs.

Figure 3:
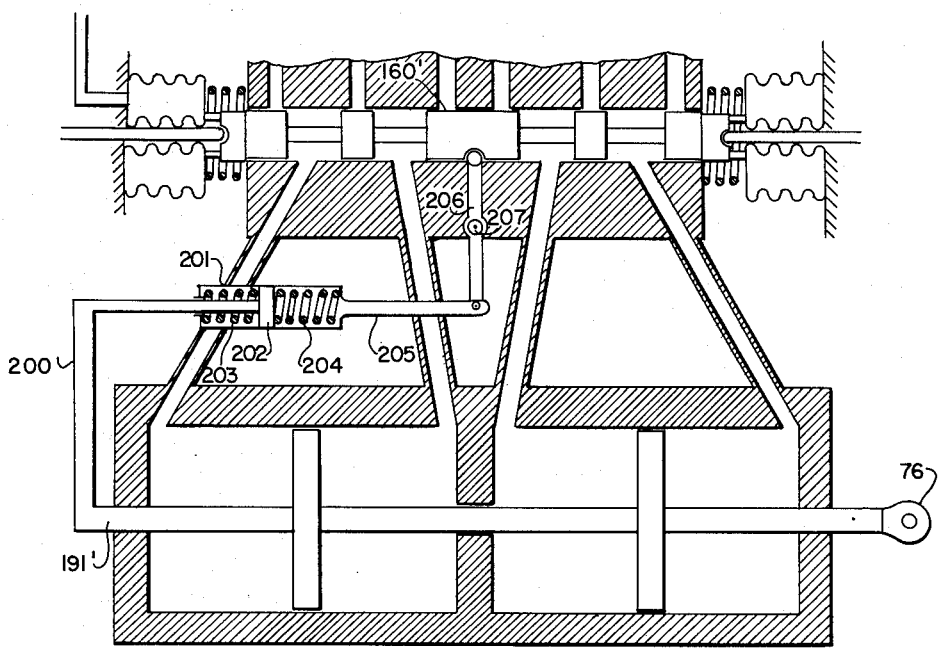
FIGURE 3 is a schematic drawing of a portion of the system shown in FIGURE 2, modified to include mechanical feedback.

In FIGURE 1, feedback elements 74 and 75 are shown in block-diagram form, to provide conventional feedback signals to the normal and standby control networks. Specific mechanizations of these elements are shown in FIGURES 2 and 3.

In FIGURE 2, the normal system receives feedback signals from three signal generators 111, 112 and 113, all forming a part of feedback element 74. Each of these signal generators includes a wiper such as 114 that wipes across a resistor such as 115 as ram 76 and shaft 191 are moved. The energizing signal is provided by a primary winding such as 117 connected to an alternating voltage source, and a secondary winding such as 116 connected across the resistor. Wiper 114 is then effective to supply a signal over lead 82 to high-pass network 91 (see FIGURE 1) that varies in phase and magnitude in accordance with the direction and extent of wiper movement.

Feedback element 75 may include a hydraulic high-pass element as shown in FIGURE 2. Hydraulic cylinder 132 is filled with hydraulic fluid, and is normally positioned as shown under the influence of integrally connected arm 135 and centering springs 136. However, when ram 76 is moved, for example to the right, arm 131 drives piston 133 to the right and hydraulic fluid at the right of piston 133 flows through orifice 134 to the left side of the piston. Thus, when the rate of movement of ram 76 is small, there is relatively little movement of arm 135; whereas sudden movements of ram 76 cause piston 134 and cylinder 132 to act substantially as a solid link, to thereby impart relatively large movements to wiper 137. Movement of wiper 137 on resistor 138 causes a signal to be placed on lead 80, in the manner described above with regard to generator 111 and lead 82. It is apparent that total characteristics of this high-pass link are established by the characteristics of spring 136 and orifice 134.

Although potentiometers are shown for supplying the various feedback signals, it should be understood that inductive pickoffs or other types of transducers would work equally well for this purpose.

FIGURE 3 shows a form of mechanical feedback that permits the elimination of the various feedback networks shown in FIGURE 2. In this configuration, piston rod 191' is mechanically connected to spool 160' by arm 200, spring member 201, and pivoted arm 206. In operation, when spool 160' is moved under the influence of the bellows, for example to the right, spring 204 is initially compressed against piston 202 on arm 200. Piston rod 191' is moved to the right under the influence of pressurized hydraulic fluid, which further compresses spring 204. Spring 204 then tends to restore arm 206 to the vertical position as shown, thereby moving spool 160' to the left whereby to prevent further movement of ram 76. However, since ram 76 is displaced to the right, spring 204 is compressed and tends to move spool 160' further to the left in order to recenter the system. Other feedback arrangements, including fully hydraulic systems, will suggest themselves to those skilled in the art.

What has been described is considered to be the preferred embodiment of our invention. However, various changes and modifications thereof can be made without departing from the spirit and scope of the invention as will be understood by those skilled in the art, and as defined in the appended claims.

What is claimed is:

1. An electro-mechanical control system for a dirigible craft, said craft provided with a control surface for changing the attitude thereof, comprising: a source of high pressure fluid; a sump; a valve chamber having a plurality of ports; a first pair of fluid lines connecting said sump and pressure fluid source to certain ones of said ports; a piston connected to operate said control surface and thereby change craft attitude; a second pair of fluid lines connected to said chamber by way of the other of said ports and arranged to direct fluid against opposite sides of said piston to achieve reversible movement thereof; a spool located in said chamber, and having a plurality of lands normally positioned to prevent fluid flow between any of said ports, movement of said spool from said normal position being effective to reposition said lands and permit fluid flow between said sump and one or the other of said piston sides, and between said source and the opposite side of said piston, depending on the direction of spool movement, thereby reversibly controlling said piston; a first pair of hydraulic bellows axially located at opposite ends of said spool, and each provided with an integrally connected control rod extending therefrom and positioned to engage said spool ends, expansion of one of said bellows being thereby effective to move said spool; a second pair of hydraulic bellows axially located at opposite ends of said spool so as to bear directly thereon, each of said second pair of bellows being concentrically and slidably positioned around one of said control rods, expansion of any one of said bellows being effective to move said spool and thereby drive said output member, while also expanding another of said bellows and compressing the remaining two bellows; a pair of axially mounted springs for restoring said second pair of bellows to an equally expanded condition, to thereby move said spool to said normal position; manual control means for changing craft attitude, movement thereof from a neutral position being effective to generate a first electrical control signal; a first electro-hydraulic transducer differentially operated by said control signal to alternately expand one of said first pair of bellows; means including said manual control means for generating an amplified second electrical control signal; and a second electro-hydraulic transducer differentially operated by said amplified signal to alternately expand one or the other of said second pair of bellows with greater power than is available from said first transducer, whereby only nominal control is effected by said first pair of bellows and transducer during normal operation of said second signal generating means.

2. An electro-mechanical control system for a dirigible craft, wherein said craft is provided with a control surface for changing the attitude thereof, and wherein a piston controlled output ram is connected to said control surface and controlled by a spool valve which directs high pressure fluid against opposite sides of said piston according to the direction of spool movement, to thereby reversibly control said piston, ram and control surface, comprising: a first pair of hydraulic bellows axially located at opposite ends of said spool, and each provided with an integrally connected control rod extending therefrom and positioned to engage said spool ends, expansion of one of said bellows being thereby effective to move said spool; a second pair of annular hydraulic bellows axially located at opposite ends of said spool so as to bear directly thereon, each of said second pair of bellows being concentrically and slidably positioned around one of said control rods, expansion of any one of said bellows being effective to move said spool and thereby drive said output member, while also expanding another of said bellows and compressing the remaining two bellows; manual control means for changing craft attitude, movement thereof from a neutral position being effective to generate a first electrical control signal; a first electro-hydraulic transducer differentially operated by said control signal to alternately expand one of said first pair of bellows; means including said manual control means operative responsive to said movement to generate an amplified second electrical control signal; and a second electro-hydraulic transducer differentially operated by said second signal to alternately expand one or the other of said second pair of bellows with greater power than is available from said first transducer, whereby only nominal control is effected by said first pair of bellows and transducer during normal operation of said second pair of bellows and transducer.

3. An electro-mechanical control system for a dirigible craft, wherein said craft is provided with a control surface for changing the craft attitude, and wherein a piston controlled output ram is connected to said control surface and controlled by a spool valve which directs high pressure fluid against opposite sides of said piston according to the direction of spool movement to thereby reversibly control said piston ram, and a control surface, comprising: a first pair of fluid bellows axially located at opposite ends of said spool, and each provided with an integrally connected control rod extending therefrom and positioned to engage said spool ends, expansion of one of said bellows being thereby effective to move said spool and compress the other of said bellows; a second pair of annular fluid bellows axially located at opposite ends of said spool so as to bear directly thereon, each of said second pair of bellows being concentrically and slidably positioned around one of said control rods, expansion of any one of said first or second bellows being effective to move said spool and thereby drive said output member, while also expanding another of said bellows and compressing the remaining two bellows; a pair of axially mounted springs for restoring said second pair of bellows to an equally expanded condition, to thereby move said spool to a normal position; manual control means for changing craft attitude; and fluid control means operated responsive to operation of said manual control means to differentially expand both said pairs of bellows to effect the attitude change called for by said operation of said manual control means, one of said pair of bellows being supplied with greater power than is supplied to the other of said pairs of bellows, whereby only nominal control is effected by said other pair of bellows during normal operation of said one pair of bellows.

4. An electro-mechanical control system for a dirigible craft, wherein said craft is provided with a control surface for changing the attitude thereof, and wherein a piston controlled output ram is connected to said control surface and controlled by a spool valve which directs high pressure fluid against opposite sides of said piston according to the direction of spool movement, to thereby reversibly control said piston, ram, and control surface, comprising: a first pair of hydraulic bellows axially located at opposite ends of said spool, and each provided with an integrally connected control rod extending therefrom and positioned to engage said spool ends, expansion of one of said bellows being thereby effective to move said spool and compress the other of said bellows; a second pair of hydraulic bellows axially located at opposite ends of said spool so as to bear directly thereon, each of said second pair of bellows being concentrically and slidably positioned around one of said control rods, expansion of one of said second pair of bellows being effective to move said spool and thereby compress the other of said second pair of bellows; manual control means for changing craft attitude, movement thereof from a neutral position being effective to generate an electrical control signal; and electro-magnetic control means for differentially expanding the bellows in each pair responsive to said control signal to thereby redundantly control the movement of said spool responsive to movement of said manual control means.

5. An electro-mechanical control system for a dirigible craft, wherein said craft is provided with a control surface for changing the attitude thereof, and wherein a piston controlled output ram is connected to said output surface and controlled by a spool valve which directs high pressure fluid against opposite sides of said piston according to the direction of spool movement to thereby reversibly control said piston, ram and control surface, comprising: a first pair of hydraulic bellows axially located at opposite ends of said spool, and each provided with an integrally connected control rod extending therefrom and positioned to engage said spool ends, expansion of one of said bellows being thereby effective to move said spool and compress the other of said bellows; a second pair of hydraulic bellows axially located at opposite ends of said spool so as to bear directly thereon, each of said second pair of bellows being concentrically and slidably positioned around one of said control rods, expansion of any one of said bellows being effective to move said spool and thereby drive said output member, while also expanding another of said bellows and compressing the remaining two bellows; a pair of axially mounted springs for restoring said second pair of bellows to an equally expanded condition, to thereby move said spool to a normal position; manual control means for changing craft attitude, movement thereof from a neutral position being effective to generate a first electrical control signal; a first magnetic conductive-fluid type pump for differentially controlling said first pair of bellows responsive to said first control signal; means including said manual control means for generating an amplified second electrical control signal; and a second electro-magnetic conductive-fluid type pump for differentially controlling said second pair of bellows responsive to said amplified second control signal, whereby only nominal control is effected by said first pair of bellows and pump during normal operation of said second pair of bellows and pump.

6. A fluid actuator of the type wherein a piston controlled output ram is controlled by a spool valve which directs high pressure fluid against opposite sides of said piston according to the direction of spool movement to thereby reversibly control said piston and ram, comprising: first control means axially located adjacent said spool so as to be in operative engagement therewith, and arranged to control said spool at a first power level; second control means axially located adjacent said spool so as to be in operative engagement therewith, and arranged to control said spool at a second power level; and means for simultaneously operating said first and second control means so as to redundantly control the movement of said spool, at different power levels.

7. A fluid actuator of the type wherein a piston controlled output ram is controlled by a spool valve which directs high pressure fluid against opposite sides of said piston according to the direction of spool movement to thereby reversibly control said piston and ram, comprising: first means including a first pair of bellows axially located at opposite ends of said spool so as to be in operative engagement therewith; second means including a second pair of bellows axially located at opposite ends of said spool so as to be in operative engagement therewith; and means for simultaneously expanding one of each of said pairs of bellows to effect a movement of said spool to thereby control said piston and ram, one of said pairs of bellows being supplied with greater expanding force than is supplied to the other of said pairs of bellows, whereby only nominal control is effected by said other pair of bellows during the normal operation of said one pair of bellows.

8. A control system for a dirigible craft, said craft having a control surface for changing the attitude thereof, comprising: means for generating a first signal in accordance with the rate of change of craft attitude; manual control means; means responsive to operation of said manual control means for generating a second signal; a plurality of signal limiters having input and output circuits; first circuit means for individually connecting said second signal source to each of said limiters by way of their respective input circuits; a hydraulic actuator including an output ram connected to said control surface, a piston for controlling said ram, and a spool valve for directing high pressure fluid against either side of said piston according to the direction of spool movement, to thereby reversibly control said piston and ram and thereby control said surface; means responsive to movement of said ram for generating a first-feedback signal; a plurality of combining means individually connected to said output circuits, said first signal generating means, and said first-feedback means, for redundantly producing a plurality of combined signals responsive to said first signal, said feedback signal, and said limited second signal; means for individually amplifying said combined signals; a first pair of bellows axially located at opposite ends of said spool, and each provided with an integrally connected control rod extending therefrom and positioned to engage said spool ends, expansion of one of said bellows being thereby effective to move said spool and compress the other of said bellows; a second pair of annular bellows axially located at opposite ends of said spool so as to bear directly thereon, each of said second pair of bellows being concentrically and slidably positioned around one of said control rods, expansion of one of said second pair of bellows being effective to move said spool and thereby drive said output member; means responsive to operation of said manual control means for generating a third signal; means responsive to movement of said ram for generating a second-feedback signal; a first transducer connected to be differentially controlled by the difference between said third signal and said first-feedback signal, to thereby expand alternate ones of said first pair of bellows; a second transducer connected to be differentially controlled by certain ones of said amplified combined signals, to thereby expand alternate ones of said second pair of bellows with greater power than is available from said first transducer, whereby only nominal control is effected by said first pair of bellows and transducer during normal operation of said second pair of bellows and transducer; and means for comparing said amplified combined signals and for disconnecting from said second transducer, those of said certain combined signals that are detected by said comparison to be abnormal, disconnection of all said certain combined signals being effective to lodge complete control of said craft in said first pair of bellows and transducer.

9. A control system for a dirigible craft, said craft having a control surface for changing the attitude thereof, comprising: means for generating a first signal in accordance with the rate of change of craft attitude; manual control means; means responsive to operation of said manual control means for generating a second signal; a plurality of signal limiters having input and output circuits; first circuit means for individually connecting said second signal source to each of said limiters by way of their respective input circuits; a hydraulic actuator including an output ram connected to said control surface, a piston for controlling said ram, and a spool valve for directing high pressure fluid against either side of said piston according to the direction of spool movement, to thereby reversibly control said piston and ram thereby control said surface; means responsive to movement of said ram for generating a first-feedback signal; a plurality of combining means individually connected to said output circuits, said first signal generating means, and said first-feedback means, for redundantly producing a plurality of combined signals responsive to said first signal, said feedback signal, and said limited second signal; means for individually amplifying said combined signals; a first pair of bellows axially located at opposite ends of said spool, and each provided with an integrally connected control rod extending therefrom and positioned to engage said spool ends, expansion of one of said bellows being thereby effective to move said spool and compress the other of said bellows; a second pair of annular bellows axially located at opposite ends of said spool so as to bear directly thereon, each of said second pair of bellows being concentrically and slidably positioned around one of said control rods, expansion of one of said second pair of bellows being effective to move said spool and thereby drive said output member; means responsive to operation of said manual control means for generating a third signal; means responsive to movement of said ram for generating a second-feedback signal; a first transducer connected to be differentially controlled by the difference between said third signal and said first-feedback signal, to thereby expand alternate ones of said first pair of bellows; a second transducer connected to be differentially controlled by certain ones of said amplified combined signals, to thereby expand alternate ones of said second pair of bellows with greater power than is available from said first transducer.

10. An electro-hydraulic control system for a dirigible craft, said craft having a control surface for changing the attitude thereof, comprising: means for generating a first damping signal; manual control means; means responsive to operation of said manual control means for generating a second signal; a plurality of signal limiters having input and output circuits; first circuit means for individually connecting said second signal generating means to each of said limiters by way of their respective input circuits; a hydraulic actuator including an output ram connected to said control surface, a piston for controlling said ram, and a spool valve for directing high pressure fluid against either side of said piston according to the direction of spool movement, to thereby reversibly control said piston and ram and thereby control said surface; means responsive to movement of said ram for generating a first-feedback signal; a plurality of combining means individually connected to said output circuits, said first signal generating means, and said first-feedback means, for redundantly producing a plurality of combined signals responsive to said first signal, said feedback signal, and said limited second signal; means for individually amplifying said combined signals; a first pair of bellows axially located at opposite ends of said spool, and each provided with an integrally connected control rod extending therefrom and positioned to engage the ends of said spool, expansion of one of said bellows being thereby effective to move said bellows being thereby effective to move said spool and compress the other of said bellows; a second pair of annular bellows axially located at opposite ends of said spool so as to bear directly thereon, each of said second pair of bellows being concentrically and slidably positioned around one of said control rods, expansion of one of said second pair of bellows being effective to move said spool and thereby drive said output member; means responsive to operation of said manual control means for generating a third signal; means responsive to movement of said ram for generating a second-feedback signal; a first electro-magnetic conductive-fluid type transducer connected to be differentially controlled by the difference between said third signal and said second-feedback signal, to thereby expand alternate ones of said first pair of bellows, a second electro-magnetic conductive-fluid type transducer connected to be differentially controlled by certain ones of said amplified combined signals, to thereby expand alternate ones of said second pair of bellows with greater power than is available from said first transducer, whereby only nominal control is effected by said first pair of bellows and transducer during normal operation of said second pair of bellows and transducer; and means for comparing said amplified combined signals and for disconnecting from said second transducer, those of said certain combined signals that are detected by said comparison to be abnormal, disconnection of all said certain combined signals being effective to lodge complete control of said craft in said first pair of bellows and transducer.

11. An electro-hydraulic control system for a dirigible craft as claimed in claim 10, wherein said second-feedback signal generating means includes a hydraulic high-pass link comprising a fluid filled housing, and piston having an orifice therethrough slidably mounted in said housing, relative movement between said piston and housing being opposed by said orifice.

12. An electro-hydraulic control system of the type wherein a piston controlled output ram is controlled by a spool valve which directs high pressure fluid against opposite sides of said piston according to the direction of spool movement to thereby reversibly control said piston and ram, comprising: manual control means; means for generating a plurality of electrical control signals responsive to operation of said manual control means; a first transducer effective when energized by one of said control signals to apply a first mechanical force to said spool and cause movement thereof; means for amplifying another of said control signals; a second transducer effective when energized by said amplified control signal to apply a second mechanical force to said spool and cause movement thereof.

13. The apparatus of claim 12, and feedback means driven by the ram and exerting an opposite effect on said spool than that applied thereto from said electrical control signals responsive to operation of said manual control means.

14. The apparatus of claim 12, and biasing means for said spool opposing the first and second mechanical forces.

15. In a condition control apparatus including a fluid actuator of the type wherein a piston is controlled by a spool valve which directs high pressure fluid against one or the other of opposite sides of said piston according to the direction of spool movement to thereby reversibly control said piston and operate condition changing means, comprising: first means including a first pair of bellows axially located at opposite ends of said spool so as to be in operative engagement therewith; second means including a second pair of bellows axially located at opposite ends of said spool so as to be in operative engagement therewith; means responsive during a change in said condition for applying pressure to one bellows in one of said pairs of bellows to effect movement of said spool to thereby control said piston; manually operable means for applying pressure to one of said bellows in said other pair to effect a movement of said spool to thereby control said piston; one of said two bellows being supplied with pressure is supplied with greater pressure than is supplied to the other of said two bellows, whereby only nominal control is effected by said other pair of bellows during the normal operation of said one pair of bellows.

16. In a fluid actuator control apparatus of the type wherein a piston is controlled by a spool valve which directs high pressure fluid alternatively against either side of said piston according to the direction of spool movement to thereby reversibly control said piston, comprising: first means including a first pair of bellows axially located at opposite ends of said spool so as to be in opposed operative engagement therewith; second means including a second pair of bellows axially located at opposite ends of said spool so as to be in opposed operative engagement therewith; a closed fluid circuit between said first pair of bellows and a closed fluid circuit between said second pair of bellows and each circuit including means for applying pressure to either one of said bellows in said circuit; and means for applying a greater effect to one of said pressure applying means so that greater pressure is applied in one circuit than the other whereby only nominal control is effected by one pair of bellows during normal operation of the other pair of bellows.

References Cited in the file of this patent

UNITED STATES PATENTS

| | | |
|---|---|---|
| 2,864,570 | Burdick et al. | Dec. 16, 1958 |
| 2,921,562 | Westbury et al. | Jan. 19, 1960 |

FOREIGN PATENTS

| | | |
|---|---|---|
| 1,037,866 | Germany | Aug. 28, 1958 |